Nov. 1, 1966        D. E. HEWES        3,281,964
ROTATING SPACE STATION SIMULATOR

Filed April 13, 1965        2 Sheets-Sheet 1

INVENTOR
DONALD E. HEWES

Nov. 1, 1966  D. E. HEWES  3,281,964
ROTATING SPACE STATION SIMULATOR
Filed April 13, 1965  2 Sheets-Sheet 2

INVENTOR
DONALD E. HEWES

BY
ATTORNEYS 3,281,964
ROTATING SPACE STATION SIMULATOR
Donald E. Hewes, Newport News, Va., assignor to the United States of America as represented by the Administrator of the National Aeronautics and Space Administration
Filed Apr. 13, 1965, Ser. No. 447,927
12 Claims. (Cl. 35—12)

The invention described herein may be manufactured and used by or for the Government of the United States of America for governmental purposes without the payment of any royalties thereon or therefor.

This invention relates generally to a rotating space station simulator, and relates with particularity to a system for generating an artificial gravity through centrifugal forces to observe and test the self-locomotion capability of a test subject under simulated rotation space station environment to thereby serve as a convenient research tool in determining and evaluating the gravity requirements for astronauts and space explorers assigned to futuristic rotating space stations, manned space laboratories, and the like.

It is contemplated that within the near future space stations or space laboratories will be regularly placed in high planetary orbits and manned by human observers and experimenters over extended periods of time. These space vehicles will be for the purpose of terrestrial and astronautical observation, as well as military surveillance, to mention but a few practical significant initial benefits anticipated by manned space flight as it is now understood. Considerable and continued research has been conducted in the United States and abroad over the past several years involving probable utilization of such orbital space stations. In addition, this research by necessity must include the psychological and physiological study of human test subject reactions to a spatial environment over extended periods of time, as well as the study of materials, structures, mechanical components and systems, and communications systems in a low or zero gravity spatial environment. It is also anticipated that manned orbital space stations may be utilized in the future for dispatching space vehicles carrying human explorers to the lunar surface and other planetary exploration of the solar system. In order to minimize some of the problems encountered in manned space flight, as it is now understood with the relatively short periods of time to which test personnel have been subjected, and in particular to minimize the deleterious effects encountered on the test subject as sensed by the semicircular canals of the inner ear, it now appears that an artificial gravity must be maintained on long time space missions for the safety of the individual astronauts, and to minimize the possibility of human error rendering an otherwise successful space mission unsuccessful.

Examples of manned orbiting space stations that now appear practical are illustrated in U.S. Letters Patent 3,144,219, issued August 11, 1964, to Emanuel Schnitzer, and U.S. Patent 3,169,725, issued February 16, 1965, to Rene A. Berglund, both patents being assigned to the National Aeronautics and Space Administration. These patented space stations are exemplary of the present thinking toward long-period manned orbital space research laboratories or stations. In each of these patented devices, it is anticipated that the occupants' living and sleeping quarters will be disposed in a substantially circular peripheral compartment arranged around a rotating axis with an artificial gravity, created by centrifugal force, being induced into the living quarters due to spinning of the particular space station about the central axis thereof. In rotation, however, certain undesirable effects are known to result which, for the long periods of time as would be experienced in a lengthy space mission, can become intolerable. These effects in our mundane activities cause sea and air sickness and, through visual illusions, have caused fatal aircraft accidents. The fundamental physical phenomena involved occurs when head or body motions are made while in a rotating environment resulting in cross-coupled angular accelerations that are sensed by the semicircular canals of the inner ear. In order to study the problems of man's tolerance to the cross-coupled accelerations with the astronauts being oriented with their long body axis perpendicular to the axis of rotation of the vehicle, as anticipated in the referenced patented devices, and to study the individual's capability of performing required body functions when subjected to this artificial gravity condition, the present invention has been developed.

Accordingly, it is an object of the present invention to provide a manned rotating satellite space station simulator for testing man's self-locomotive capability under these conditions.

Another object of the instant invention is the provision of a rotating space station simulator having the capability of simulating, on earth, the artificial gravity gradients anticipated for an astronaut when placed in a planetary orbit aboard a rotating space vehicle.

Another object of the present invention is the provision of a rotating space station simulator including a support for maintaining the test subject in the simulator in such condition that the only gravitational component affecting the movement of the test subject's body will be along his long body axis.

Still a further object of the present invention is to provide a manned rotating space station simulator employing alternate flooring arrangements therein to be traversed by a test subject under his own self-locomotive power.

A further object of the present invention is a rotating space station simulator to study and evaluate the gravity needs for astronauts assigned to futuristic rotating space stations.

Yet another object of the present invention is a rotating space station simulator having multiple levels therein to study the requirements of a test subject to walk, or by other self-locomotive means, to get from one section of a whirling space station to another, to determine the requirements for propelling himself slowly or rapidly up a ladder or stairway, and to study the individual reaction to varying floor arrangements anticipated in the design of the interior of a rotating space station.

According to the present invention, the foregoing and other objects are attained by providing a gantry spanning a circular platform, with a circular peripheral wall or walkway mounted vertically along the periphery of the platform so as to resemble an opened end tube. The platform is pivoted and supported by an integral vertical shaft so as to be rotatable about its central vertical axis, with a suitable motor drive providing controlled relative rotation of the shaft within the gantry. A horizontal beam is supported by the vertical shaft so as to be free to rotate relative to and in the horizontal plane about the vertical shaft.

The motor drive unit is capable of rotating the system up to a desired rotational rate and maintaining this rate to build up an artificial gravity, through centrifugal forces, acting on the vertical circular walkway. The horizontal beam supports a suitable trolley unit free to move linearly along the beam with a cable system being attached to the trolley and terminating in a system of slings for supporting a test subject, such as that disclosed in the copending application Serial No. 304,749, filed August 26, 1963, for a Reduced Gravity Simulator. This cable and sling arrangement permits the test subject to be suspended in a substantially zero-G condition while being free to move his body members in essentially parallel planes in much the same manner as that performed during most locomotive body movements while in the normal upright position. Inasmuch as the body members move only in the horizontal plane in which gravity does not act, a simulated condition of weightlessness, or zero-G gravity is produced.

Simulated gravity is produced by rotating the circular platform and test subject in the same manner as is contemplated for presently proposed rotating space stations or orbital research laboratories. The trolley and horizontal beam are controlled so as to stay directly over the test subject at all times as he moves around the perimeter of the circular platform or moves radially up and down ladders, steps, and other obstacles disposed about the platform to simulate the expected design interior of rotating space stations. These ladders and other obstacles are structural features integrally secured to the walkway to simulate various design features which will be incorporated in possible futuristic space stations, particularly in the artificial gravity area to be found in the torus-shaped crew quarters.

A more complete appreciation of the invention and many of the attendant advantages thereof will be readily apparent as the same becomes better understood by reference to the following detailed description when considered in connection with the accompanying drawings wherein.

Figure 1:
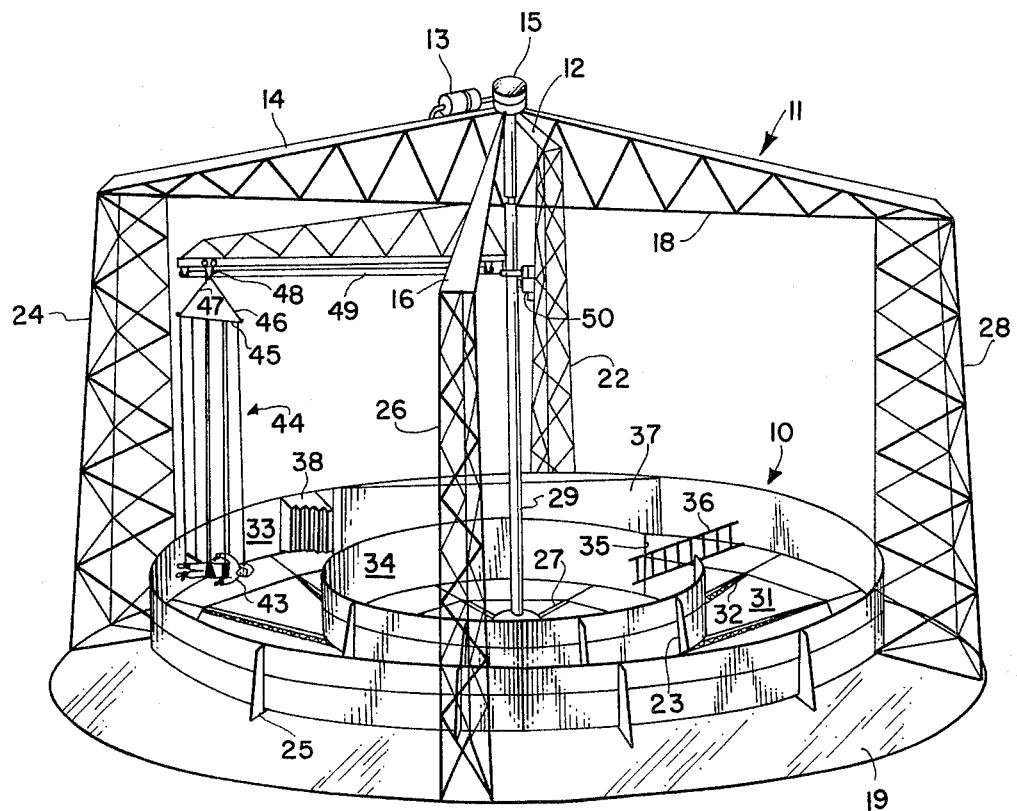
FIG. 1 is a schematic representation of the rotating space station simulator of the present invention in operative condition.

Referring now more particularly to the drawings, wherein like reference numerals designate identical parts throughout the several views, and more particularly to FIG. 1, there is shown a rotating space station simulator, generally designated by reference numeral 10 and housed by a suitable gantry, generally designated by reference numeral 11. Gantry 11 includes four equiangular disposed horizontal beams radiating from the center thereof and designated, respectively, by reference numerals 12, 14, 16 and 18. The outer end of each of beams 12, 14, 16 and 18 attach, respectively, to four vertical columns designated, respectively, by reference numerals 22, 24, 26, and 28 and extending from concrete base 19.

A vertical shaft 29 extends through the center intersections of horizontal beams 12, 14, 16 and 18 and is provided with suitable friction reducing bearings thereabout, not shown. Shaft 29 is in rigid engagement with hub 30 of circular platform 31 for inducing rotative movement thereof, as will be further explained hereinafter. The opposite end of hub 30, not shown, extends through platform 31 and is provided with a suitable spike or the like for engagement with a conventional friction reducing bearing surface supported by the concrete base 19, to provide free pivotal rotation of circular platform 31 about the center axis thereof under the influence of motor drive unit 13 and selective gears 15.

A vertical walkway 33 perpendicularly circumscribes the periphery of circular walkway 31 to provide a walk surface area for an individual test subject 43, as will be further explained hereinafter. An additional circular walkway 34 is also provided integrally attached to circular platform 31 substantially intermediate hub 30 and vertical walkway 33. A plurality of suitable vertical brackets 23 and 25 and radial braces 27 and 32 assist in securing circular walkways 33 and 34 to circular platform 31, in a conventional manner. Inner walkway 34 is provided with a suitable porthole 35 for receipt therein of a ladder 36 which is integrally attached to the surface of vertical walkway 33 to provide suitable ingress and egress between the two walkways by the test subject 43.

Additional alternate flooring arrangements for walkway 33 to simulate the various flooring that might be anticipated in a rotating space station is schematically illustrated by platform 37 and stairs or stepped platform 38, which are also integrally attached to vertical walkway 33. Stepped platform 38 permits observation of test subject ability to climb short stairways and to execute slight jumping movement from a raised platform when disposed in a rotating space station environment.

Test subject 43 is suspended in a zero gravity suspension attitude by a plurality of cables, generally designated in FIG. 1 by reference numeral 44, which lead from the individual body components of test subject 43 to a supporting horizontal bar 45. Bar 45 is attached by a pair of angular cables 46 and 47 to a trolley unit 48. Trolley 48 is adapted to freely move along horizontal boom 49, extending from vertical shaft 29, and under the control of a boom and trolley servo drive system designated by reference numeral 50. The boom and trolley servo drive system 50 is so constructed as to maintain horizontal boom 50 and trolley 48 directly over test subject 43 as the test subject executes self-locomotive movement about walkways 33 and 34 and the attached obstacles thereon. More specifically, boom and trolley drive mechanism 50 is actuated by the influence of the test subject body weight on trolley 48 and, through the conventional servo mechanism, maintains horizontal boom 50 and trolley 48 in a substantially vertical attitude over the test subject body at all times during execution of his self-locomotive movement.

Figure 2:
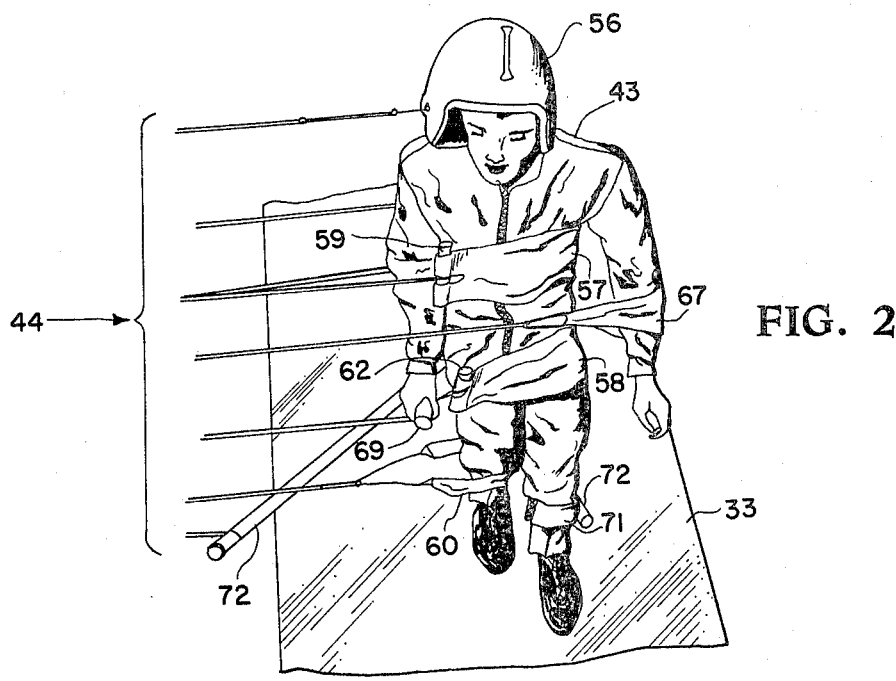
FIG. 2 is an enlarged view of the sling and cable support system for the test subject shown within the rotating space station simulator of FIG. 1.

Referring now more particularly to FIG. 2, among the individual body supports to which the suspension cables 44 lead, is a protective helmet 56 strapped beneath the chin of test subject 43 for protection and support of the head. It is apparent that helmet 56 will bear against one side of the head of test subject 43 in such manner as to require the use of adequate conventional shock absorbing material, such for example, a heavy foam rubber liner. Torso support of test subject 43 is provided by a chest sling 57 positioned beneath the arm pit, and a hip sling 58 passing essentially around the hip and buttocks of subject 43. The ends of sling 57 are secured in a conventional manner to a pair of light-weight rods, one of which is shown in FIG. 2 and designated by reference numeral 59, and the other of which is not shown. Rod 59 and its counterpart, not shown, serve to attach sling 57 to suspension cables 44. Hip sling 58 is also provided with a pair of rods, one of which is shown in FIG. 2 and designated by reference numeral 62, with the other being disposed in back of the test subject, and not shown, to connect hip sling 58 to the suspension cables 44.

The lowermost or left arm of test subject 43, as illustrated in FIG. 2, is supported by arm sling 67 which is connected to suspension cables 44 in a conventional manner. Also secured to suspension cables 44 is a hand grasp rod 69 positioned in such manner as to be readily grasped by the uppermost or right hand of test subject 43, to provide selective support for this arm, when desired, during the test phase of the rotating space station simulator.

The uppermost or right leg of test subject 43 is supported by suspension cables 44 by a suitable leg sling 60. The support for the left or lowermost leg of test subject 43 is provided by a laced strap 71 tightly secured about the calf of test subject 43 and having a light metal rod 72 secured to strap 71. Rod 72 is angularly bent to pass behind test subject 43 to avoid obstructing test subject movement while also bent to permit attachment to suspension cable 44 at a point directly above strap 71.

The individual slings and straps making up the harness support for test subject 43 may be formed of any conventional high tensile strength material, such for example canvas, or the like, and the individual cables 44 may be of any conventional small diameter high tensile strength material capable of supporting the weight of test subject 43. The relative position of the body members and sling supports are illustrative only and it is readily apparent that the position of the test subject could be reversed when opposite rotation of the rotating space station simulator is desired.

As is apparent from the above description, test subject 43, when suspended as described, is free to walk, run, jump, crawl, as well as catch or lift loads of various size, shape or bulk that may be positioned in the path of movement along circular walkway surfaces 33 and 34, with access between the two walkways being readily provided by ladder 36.

Figure 3:
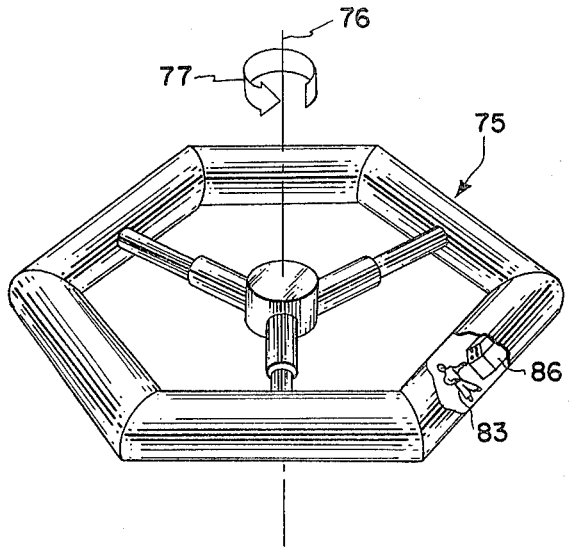
FIG. 3 is a schematic illustration of a typical rotating space station illustrating the relative position of a manned occupant therein under conditions which the present invention is designed to simulate.

Referring now more particularly to FIG. 3, a typical rotating space station is schematically shown and designated generally by reference numeral 75, of the type of which the present invention is designed to simulate the rotative environment therein. Space station 75 is designed to rotate about its axis 76, as designated by arrow 77. Inasmuch as rotating space stations of this type are well known, as illustrated in the reference patents, further description thereof will not be included herein, it sufficing to say here that an occupant 83 in space station 75 would be subjected to centrifugal forces acting along the subject long body axis and will be expected to be able to manipulate suitable instrumentation, schematically shown and designated by reference numeral 86 within the individual compartments of the space station 75. Thus, by use of the present invention, it is now possible to predict and test, on earth, the capabilities of individual performance and to determine the optimum centrifugal forces or rotating speeds required for futuristic space stations 75.

OPERATION

Referring now back to FIG. 1 the operation of the present invention is now believed apparent from the above description. More specifically, test subject 43 is suspended in a zero G attitude by suspension system 44, in position to traverse walkways 33 and 34 therein. A suitable platform motor drive unit 13 connected to a conventional power supply, not shown, is then actuated to induce rotative movement of vertical shaft 29 and the attached circular platform 31. The speed of rotation for shaft 29 is governed to that necessary through selective gears 15 to achieve the required centrifugal forces acting on the test subject 43 to simulate a gravitational component acting along his long body axis to that desired in the design of a specific rotating space station. Upon achievement of the required rotative speed for platform 31, test subject 43 may then execute self-locomotive movement along circular walkway 33 with horizontal boom 49 and trolley 48 being maintained in a vertical attitude above test subject 43 through the operation of the boom and trolley servo drive system 50. Inasmuch as all the self-locomtive movements of the test subject 43 act essentially in parallel planes, in a vertical direction to the gravity components thereof, these movements will be influenced only by the gravitational component acting through the long body axis of the subject as in essentially normal walking fashion on earth. The use of the multiple cables 44 permits free movement of each body member in only one plane, that is the plane parallel to the body's plane of symmetry so that the vertical gravity vector acting in the plane of movement is essentially only that as induced by the centrifugal forces emanating from rotation of circular platform 31.

It is readily seen that the present invention may be employed to simulate essentially any rotating gravitational force desired, such as that anticipated for rotating space station laboratories with the length of the specific test being limited only to the endurance of the individual test subject, to thereby facilitate evaluation, training and testing of individuals to simulated space station conditions for long periods of time. Thus, the present invention readily contributes to the optimum design of space stations as well as providing a useful training device to select and train capable individuals for sustained space exploration. In addition, by selecting various flooring arrangements and testing other obstacles attached to the vertical walkways, test subject evaluation and improved design of futuristic space stations may be readily accomplished. In addition to the above, other advantages apparent from the present invention will permit individual reconditioning as well as the evaluation of sustained change in gravitational conditions on individual test subjects after a sustained space flight to evaluate the psychological and physiological changes experienced in the individual test subject's inner ear mechanism and other body functions.

Although the present invention has been described as simulating a rotating space station environment, it is readily apparent that obvious utility of this invention may be found in the rehabilitation of accident or stroke victims learning to walk again after being incapacitated as the result of illness or injury. In this latter respect, the individual is sustained in a complete suspended condition by the cable arrangement 44, as described hereinbefore, with the only gravitational forces acting thereon being induced by revolving circular platform 31, to thus permit an individual to "learn to walk" again at increasing gravitational conditions from zero to one G until the individual again "learns" complete self-locomotive ability of his body appendages.

It is also readily seen that gravitational forces exceeding that of earth, as well as those from zero gravity to that of earth, or one G, may be readily obtained by the present invention, with the maximum gravitational forces obtainable being limited only by the rotative speeds of circular platform 31. Thus, the present invention may be readily employed to condition astronauts to walk on planetary surfaces having gravitational fields different from that of earth, such for example lunar gravity which now believed to be only ⅙ that of earth, as well as other planetary gravitational fields which exceed that of earth.

It is therefore readily apparent that the present invention, utilizing various and inexpensive cable suspension equipment and gantry structure, is a practical and useful apparatus for familiarizing space mission personnel with their capabilities and sensations while under the influence of rotating space station gravitational fields as well as gravitational fields on other planets differing from that of earth. Since this invention can provide substantially unlimited duration of the test period and is adequate for permitting performance of most of the modes of self-locomotion by an individual test subject, the evaluation of the various forms of man's self-locomotion, including the range and duration limits of man's walking and running, as well as his ability to carry various amounts of equipment or loads and perform other useful functions, can adequately be predicted and observed on earth prior to undertaking of actual space missions.

Obviously, many modifications and variations of the above invention are possible in the light of the above teachings. For example, the alternate flooring arrangements as schematically illustrated herein could include a treadmill device to provide a substantially fixed walkway along vertical walkway 33, and other obvious individual suspension systems could be used, including the use of specifically designed space suits, employed in lieu of the cable suspension system as described herein. In view of these and other obvious modifications and variations apparent to those skilled in the art, it is to be understood that within the scope of the appended claims that the invention may be practiced otherwise than as specifically claimed herein.

What is claimed and desired to be secured by Letters Patent of the United States:

1. Apparatus for simulating the gravitational and attitude environment anticipated for space travelers in a rotating space station, comprising:
- a gantry,
- vertical shaft means centrally positioned within said gantry for relative rotative movement therewith,
- a circular platform integrally secured to said vertical shaft and spanned by said gantry,
- a circular walkway integrally disposed about the periphery of said platform,
- means operatively connected to said vertical shaft for suspending a test subject in a horizontal attitude and in such position as to permit self-locomotion about said circular walkway,
- means for rotating said vertical shaft and the attached platform and walkway at a selected controlled speed, whereby as said platform rotates a centrifugal force will be developed that will act through the long body axis of said test subject and effectively simulate an artificial gravity force as would be present in a rotating space station.

2. Apparatus as in claim 1 wherein said means for suspending a test subject includes:
- a horizontal boom extending from said vertical shaft and being so constructed and arranged as to be relatively rotatable about said vertical shaft,
- a trolley unit freely movable along said horizontal boom,
- a cable suspension system extending from said trolley,
- a plurality of slings and straps for engaging and supporting a test subject in a horizontal attitude adjacent said circular walkway,
- said slings and straps being attached to said cable suspension system,
- means operable by said test subject self-locomotive movement to maintain said horizontal boom and said trolley unit essentially vertically disposed in a parallel plane with the long body axis of said test subject as said test subject executes self-locomotive movement along said circular walkway.

3. Apparatus as in claim 1 including: means disposed on said circular walkway simulating a variety of obstacles to be traversed by said test subject as he executes self-locomotive movement along said circular walkway.

4. Apparatus as in claim 1 including:
- a second circular walkway integrally secured to said circular platform, and
- means providing test subject ingress and egress between said second circular walkway and said walkway disposed about the periphery of said circular platform.

5. A system for testing individual self-locomotive capabilities when exposed to a gravitational environment different from that of earth comprising:
- a circular platform having a centrally disposed axis and a vertically disposed circular walkway thereon,
- support means for maintaining a test subject in a horizontal attitude and in position to traverse said walkway,
- means for effecting rotation of said circular platform about said axis so as to develop a centrifugal force acting on the long body axis of the test subject, whereby
- the resultant force vector of the developed centrifugal force and said support means serve to simulate a gravitational environment different from that normally experienced on earth.

6. A system as defined in claim 5 wherein:
- said support means includes a system of cables and slings so constructed and arranged as to completely support the test subject body while permitting self-locomotive movement of the body appendages,
- means for freely permitting horizontal movement of said support means as required during self-locomotive movement of said test subject, and
- means on said walkway for simulating anticipated self-locomotive obstacles in a rotating space station.

7. Apparatus for simulating on earth the gravitational and attitude environment anticipated for space travellers in a rotating space station, comprising:
- a rigid gantry,
- vertical shaft means positioned within said gantry for relative rotative movement therewith,
- a platform integrally secured to said vertical shaft and spanned by said gantry,
- a vertical walkway integrally disposed about the periphery of said platform,
- means for suspending a test subject in a horizontal attitude and in such position as to permit his self-locomotive movement about said circular walkway,
- means for rotating said vertical shaft and the attached platform and walkway at a selected controlled speed, whereby as said platform rotates a centrifugal force will be developed that will act through the long body axis of said test subject to thereby effectively simulate an artificial gravity environment in the plane of test subject movement.

8. A rotating space station simulator for simulating on earth the gravitational and attitude environment anticipated for space travelers in a particular space vehicle comprising:
- a walkway to be traversed by a test subject,
- means for supporting a test subject substantially perpendicularly disposed relative to said walkway and at a substantially zero earth gravity,
- means for inducing a centrifugal force component acting along the long body axis of the test subject so as to simulate an artificial gravitational component that would be acting along the long body axis of the test subject in a rotating space station.

9. A rotating space station simulator as in claim 8 including:
- a second walkway to be traversed by a test subject, and
- means providing ingress and egress by said test subject between said walkway during operation of the simulator.

10. Apparatus for simulating on earth the gravity condition anticipated for space travelers in a rotating space station comprising:
- a circular platform,
- a circular walkway disposed about the periphery of said platform,
- means supporting said platform and walkway for rotational movement about a vertical axis taken through the center of said platform,
- means operatively connected to said means supporting said walkway for suspending a test subject in a horizontal attitude and at substantially zero earth gravity state in such position as to be able to traverse said circular walkway,
- means for rotating said platform at a controlled speed, whereby
- as said platform rotates, a centrifugal force will be developed that will act through the long body axis of said test subject to effectively simulate an artificial gravity component that would be anticipated in a rotating space station.

11. Apparatus as in claim 10 including:
- a second circular walkway disposed on said platform,
- said second walkway being substantially intermediate the platform rotative axis and said walkway disposed about the periphery of said platform,
- means providing ingress and egress between said walkways by said test subject during his self-locomotive movement and while said platform is being rotated and
- obstacle means disposed at selected sites along said walkways to simulate anticipated interior design of a rotating space station.

12. A method of simulating a gravitational field permitting self-locomotive movement of an individual for detecting and testing on earth the psychological and physiological changes experienced by a space traveler in a prolonged extraplanetary space flight on board a rotating space station comprising:
  supporting an individual prospective space traveler in a substantially horizontal attitude relative to earth and at a substantially zero G condition,
  said individual being supported in such manner as to permit relatively free parallel planar movement of his body appendages,
  providing a circular walkway perpendicularly disposed relative to said individual and in such position as to permit self-locomotive movement of said individual along said walkway,
  inducting rotative movement of said walkway so as to develop a centrifugal force component acting through the long body axis of said individual to thereby generate an artificial gravity of the degree anticipated for a rotative space station.

References Cited by the Examiner
UNITED STATES PATENTS

| | | | |
|---|---|---|---|
| 3,136,075 | 6/1964 | Brian | 35—12 |
| 3,209,468 | 10/1965 | Frisch | 35—12 |

References Cited by the Applicant
UNITED STATES PATENTS

| | | |
|---|---|---|
| 3,010,219 | 11/1961 | Schueller. |
| 3,010,220 | 11/1961 | Schueller. |
| 3,041,741 | 7/1962 | Barker. |
| 3,064,364 | 11/1962 | Schueller. |
| 3,083,473 | 4/1963 | Luton. |
| 3,084,454 | 4/1963 | Schueller. |

EUGENE R. CAPOZIO, *Primary Examiner.*

R. E. KLEIN, *Assistant Examiner.*